US008879909B2

(12) United States Patent
Heimbuch et al.

(10) Patent No.: US 8,879,909 B2
(45) Date of Patent: Nov. 4, 2014

(54) CIRCUITS AND METHODS FOR MONITORING POWER PARAMETERS IN AN OPTICAL TRANSCEIVER

(75) Inventors: Mark Heimbuch, Chatsworth, CA (US); Mohammad Azadeh, Northridge, CA (US)

(73) Assignee: Source Photonics, Inc., Chatsworth, CA (US)

( * ) Notice: Subject to any disclaimer, the term of this patent is extended or adjusted under 35 U.S.C. 154(b) by 142 days.

(21) Appl. No.: 13/455,937

(22) Filed: Apr. 25, 2012

(65) Prior Publication Data

US 2013/0287392 A1    Oct. 31, 2013

(51) Int. Cl.
*H04B 10/08*    (2006.01)

(52) U.S. Cl.
USPC ............... 398/38; 398/25; 398/9; 398/135; 398/202; 250/214 LA; 250/214 A

(58) Field of Classification Search
None
See application file for complete search history.

(56) References Cited

U.S. PATENT DOCUMENTS

| | | | | |
|---|---|---|---|---|
| 5,535,038 | A  * | 7/1996 | Hinch | 398/182 |
| 6,930,300 | B1 * | 8/2005 | Douma et al. | 250/214 A |
| 7,200,336 | B2 | 4/2007 | Yu et al. | |
| 7,650,077 | B2 | 1/2010 | Yu et al. | |
| 2005/0031357 | A1 * | 2/2005 | Soto et al. | 398/198 |
| 2005/0121632 | A1 * | 6/2005 | Chieng et al. | 250/559.1 |
| 2005/0232635 | A1 * | 10/2005 | Aronson et al. | 398/135 |
| 2006/0222370 | A1 * | 10/2006 | DeCusatis et al. | 398/135 |
| 2008/0138092 | A1 * | 6/2008 | Nagakubo | 398/202 |
| 2010/0183296 | A1 * | 7/2010 | De Langen et al. | 398/16 |

OTHER PUBLICATIONS

Chris LaBounty, Todd Rope, Tom Ciplikas and Near Margalit; "Circuits, Architectures, Apparatuses, Methods and Algorithms for Determining a DC Bias in an AC or AC-Coupled Signal"; U.S. Appl. No. 13/206,285, filed Aug. 9, 2012.

\* cited by examiner

*Primary Examiner* — Kenneth Vanderpuye
*Assistant Examiner* — Merlin Brito Peguero
(74) *Attorney, Agent, or Firm* — Central California IP Group, P.C.; Andrew D. Fortney

(57) ABSTRACT

A circuit, optical transceiver and/or methods for using the same may be useful for determining average power, extinction ratio, and/or modulation amplitude when monitoring an optical transceiver and/or optical network. The circuit generally comprises a photodiode configured to generate a first current responsive to an optical signal, a current mirror coupled to a first terminal of the photodiode, and a detector coupled to a second terminal of the photodiode. The current mirror is configured to produce a second current equal to or proportional to the first current, and the detector is configured to determine a power or amplitude of the optical signal. Further, the present scheme may communicate information using a low speed signal superimposed on or combined with the relatively high speed optical signal.

21 Claims, 6 Drawing Sheets (Background)

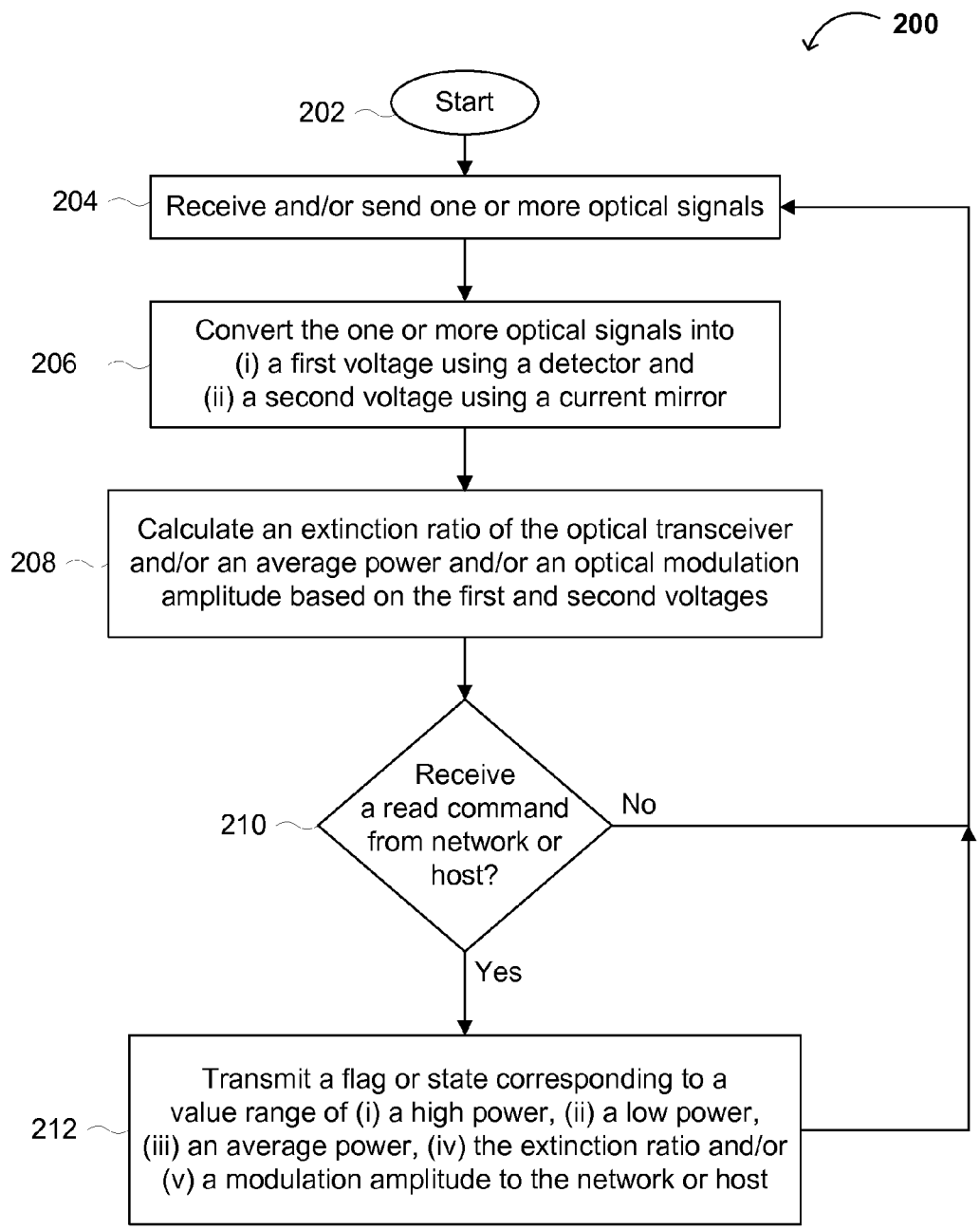

CIRCUITS AND METHODS FOR MONITORING POWER PARAMETERS IN AN OPTICAL TRANSCEIVER

FIELD OF THE INVENTION

The present invention generally relates to the field of optical transceivers, optical data communications and network technology. More specifically, embodiments of the present invention pertain to methods, architectures, circuits, and/or systems for monitoring and/or communicating with optical devices, including optical transceivers.

DISCUSSION OF THE BACKGROUND

In the field of optical data communications, data is generally transmitted using variations in light intensity. For instance, a high optical power ($P_1$) or low optical power ($P_0$) may be used to represent the logical bits one and zero, respectively. FIG. 1 shows the relation between an exemplary optical signal 100 and its corresponding logical signal 120 or bit pattern 130.

Optical transceivers send and receive data in an optical form over an optical link, such as a fiber-optic link. An optical transmitter can include laser driver circuitry to drive a laser diode (LD) and create optical pulses on the fiber-optic link from received electronic signals. An optical receiver can include a photosensitive diode to receive the optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters relating to the optical signal may be monitored. An extinction ratio, an average power and an optical modulation amplitude are examples of such parameters and can be useful indicators of the "health" of the transmitter of an optical transceiver.

The average power ($P_{avg}$) of the exemplary optical signal can be determined according to the equation:

$$P_{avg} = (P_1 + P_0)/2 \quad [1]$$

where $P_1$ is the power of the signal corresponding to a "1" state, and $P_0$ is the power of the signal corresponding to a "0" state.

An extinction ratio (ER) is a measure of depth of modulation, and is equal to the ratio between the high ($P_1$) and low ($P_0$) power levels of the optical signal. ER can be calculated according to the equation:

$$ER = P_1/P_0 \quad [2]$$

where $P_1$ is the power of the signal corresponding to a "1" state, and $P_0$ is the power of the signal corresponding to a "0" state. An ER may be expressed as a ratio, percentage or decibel (dB). An optical oscilloscope is typically used to generate a representation of the optical signal from the optical transceiver, from which the ER is generally calculated. As such, conventional optical transceivers do not typically calculate the ER of optical signals they send and/or receive.

The optical modulation amplitude (OMA) is the difference between the high ($P_1$) and low ($P_0$) power levels of the optical signal. OMA may be calculated according to either of the following equations:

$$OMA = P_1 - P_0 \quad [3]$$

$$OMA = 2P_{avg}[(ER-1)/(ER+1)] \quad [4]$$

where $P_1$ is the power of the signal corresponding to a "1" state, and $P_0$ is the power of the signal corresponding to a "0" state. Conventional optical transceivers typically do not determine the optical modulation amplitude (OMA) of an optical signal. The link budget of an optical link is a direct function of the OMA of the signal.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention pertain to methods, architectures, circuits, optical transceivers and/or receivers and/or systems for monitoring and/or communicating with optical devices.

In one embodiment, the present circuit can include a photodiode (PD) configured to generate a first current responsive to an optical signal, a current mirror (CM) coupled to a first terminal of the PD, the CM being configured to produce a second current equal to or proportional to the first current, and a detector coupled to a second terminal of the PD, the detector being configured to determine a power or amplitude of the optical signal. In general, the detector can receive the alternating current (AC) power of the optical signal and output a direct current (DC) signal equal or proportional to the AC power. In some embodiments, the detector comprises an RF detector. In another embodiment, a first amplifier is coupled to the CM. In another embodiment, the circuit comprises a second amplifier coupled to the second terminal of the PD, in which the detector receives an output of the second amplifier. In a further embodiment, the circuit comprises logic configured to evaluate an extinction ratio (ER) based on (i) a first voltage from the second amplifier and/or the detector, and (ii) a second voltage from the CM.

Additionally, embodiments of the present invention relate to an optical transceiver comprising the circuit discussed above, a transmitter optical sub-assembly (TOSA) configured to transmit the optical signal, and logic configured to process the extinction ratio (ER) from the first and second voltages. In a further embodiment, the optical transceiver comprises a TOSA that includes the photodiode (PD) for generating a current responsive to an optical signal.

Another embodiment of the invention relates to a method for monitoring one or more optical transceivers, the method comprising receiving and/or sending one or more optical signals, converting the one or more optical signals into (i) a first voltage using a detector and (ii) a second voltage using a current mirror (CM), and calculating an extinction ratio (ER) of the optical transceiver and/or a modulation amplitude (e.g., an OMA) of the optical signal based on the first and second voltages. In some embodiments, the method further comprises transmitting state information and/or one or more flags corresponding to a value range of (i) a high power, (ii) a low power, (iii) the extinction ratio, (iv) the average power and/or (v) the modulation amplitude.

Another embodiment of the invention relates to a method for communicating information, generally comprising receiving one or more optical signals in an optical receiver, the optical signal(s) having a first relatively constant frequency and either (i) an amplitude, extinction ratio, high power and/or average power that varies according to a second frequency less than the first frequency and that may have a value other than the allowed value(s) for binary data, or (ii) an amplitude, extinction ratio and/or high power that varies across or among more than n states, where n represents the number of allowed states for transmitting data over the network; and extracting a low speed signal having the second frequency from the one or more optical signals.

The present disclosure overcomes disadvantages of the existing technology, such as the inability to internally measure and/or monitor certain performance and/or operational parameters of the optical transceiver in real time. Advantages of the present invention include the ability to calculate, monitor and track average power, extinction ratios and modulation amplitudes on-board and in real-time, and use that information to change and/or modify the performance of the optical transceiver. Further, the invention advantageously provides for characterizing link budgets and/or the "health" of the optical transceiver and/or an optical link with respect to average power, ER and OMA.

Various embodiments and/or examples disclosed herein may be combined with other embodiments and/or examples, as long as such a combination is not explicitly disclosed herein as being unfavorable, undesirable or disadvantageous. These and other advantages of the present invention will become readily apparent from the detailed description of various embodiments below.

BRIEF DESCRIPTION OF THE DRAWINGS

FIG. 2 is a flow diagram showing an exemplary method for monitoring one or more optical signals in an optical transceiver in accordance with embodiments of the present invention.

DETAILED DESCRIPTION

Figure 1:
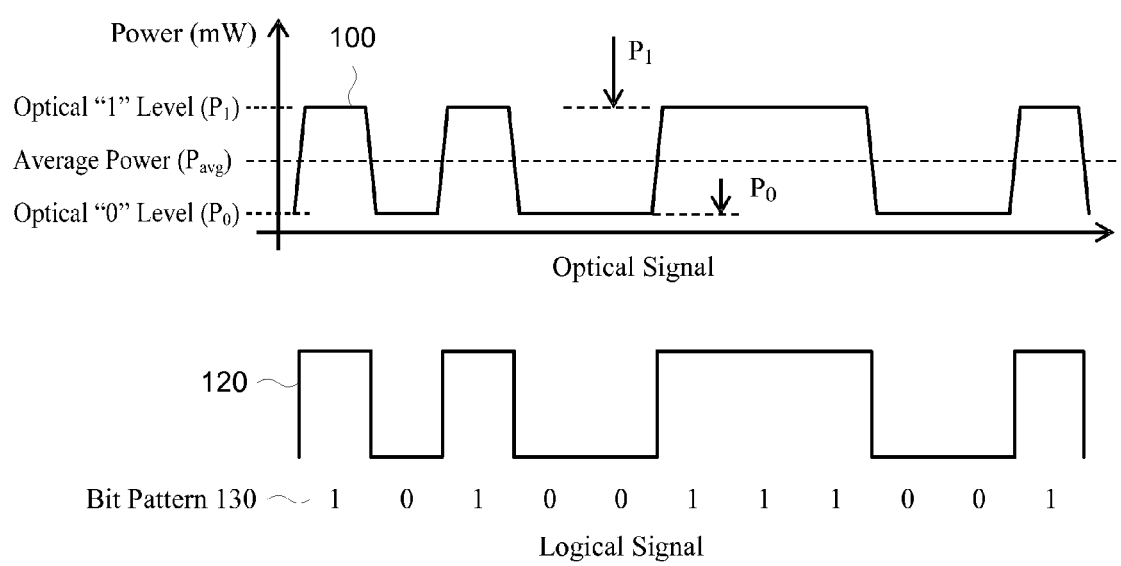
FIG. 1 is a diagram showing a conventional optical signal and the corresponding logical signal and bit pattern.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, Claims, Abstract and Figures can be replaced by other equivalent characteristics or characteristics with similar objectives, purposes and/or functions, unless specified otherwise. Each characteristic is generally only an embodiment of the invention disclosed herein.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "node," "signal," and "bus" refer to any known structure, construction, arrangement, technique, method and/or process for physically transferring a signal from one point in a circuit to another. Also, unless indicated otherwise from the context of its use herein, the terms "designated," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "time," "rate," "period" and "frequency" (and grammatical variations thereof) are, in general, interchangeable and may be used interchangeably herein, but are generally given their art-recognized meanings. Also, for convenience and simplicity, the terms "data," "data stream," "bits," "bit pattern" and "information" may be used interchangeably, as may the terms "coupled to," and "in communication with" (which may refer to direct or indirect connections, couplings, or communications), but these terms are generally given their art-recognized meanings herein.

For the sake of convenience and simplicity, the terms "optical signal" and "light" are generally used interchangeably herein, and use of either of these terms also includes the other, unless the context clearly indicates otherwise. Similarly, the following groups of terms are generally used interchangeably herein, and the use of any one of these terms also includes the others, unless the context clearly indicates otherwise:

"optical" and "optoelectronic";
"optical device," "optoelectronic device," "optical transceiver" and "optoelectronic transceiver";
"transmitter" and "transceiver"; and
"receiver" and "transceiver".

Embodiments of the present invention advantageously provide a circuit and/or method that calculate an operational state of an optical transceiver, such as an extinction ratio, and/or a characteristic or value of an optical signal parameter such as optical modulation amplitude, and/or that communicates and/or receives and processes a relatively low speed signal superimposed or overlaid on another relatively high speed signal. According to various embodiments of the present invention, an architecture or circuit for monitoring parametric data related to power(s) and/or a power range of an optical signal, suitable for use in optical transceivers, is provided.

Embodiments of the present invention allow for generation of additional information concerning operations and performance of an optical transceiver. For instance, various embodiments advantageously allow an optical transceiver to internally measure extinction ratios and/or optical modulation amplitudes. Embodiments of the present invention also provide for monitoring operational parameters of the transmitter and/or receiver through a Digital Diagnostic Monitoring Interface (DDMI). Thus, the present circuit(s), optical transceiver and/or methods provide for improved monitoring of an optical transmitter and/or receiver in a network, including power-related parameters such as average power, extinction ratio, optical modulation amplitude, link loss and/or link budget. Further embodiments provide for communication of information using a low speed modulated signal superimposed or overlaid on the optical signal.

These and other advantages of the present invention will become readily apparent from the detailed description of preferred embodiments below. The invention, in its various aspects, will be explained in greater detail below with regard to exemplary embodiments.

Exemplary Method for Monitoring One or More Optical Transceivers

In one aspect, the present invention relates to a method for monitoring optical signal parameters in an optical transceiver, the method comprising receiving and/or sending one or more optical signals, converting the one or more optical signals into (i) a first voltage using a detector and (ii) a second voltage using a current mirror, and calculating an extinction ratio, an average power and/or a modulation amplitude based on the first and second voltages.

In general, the first voltage corresponds to an amplitude of the optical signal, and the second voltage corresponds to average power ($P_{avg}$). Using such voltages, the method provides for the determination of various parameters related to an optical transceiver and the optical signal received and/or transmitted by the optical transceiver, such as an average power ($P_{avg}$), a high power ($P_1$), a low power ($P_0$), an ER and/or an OMA.

FIG. 2 illustrates an exemplary method 200 for monitoring one or more optical signals sent and/or received by an optical transceiver according to the present invention. The method typically involves continuous processing through various loops in the flow, although it also encompasses a single pass through part or all of the flow. For example, in the method, upon stable application of power, an optical transceiver continuously receives optical transmissions from the network of which it is part (e.g., as an optical line terminal [OLT] and/or as an optical network unit [ONU]), and continuously calculates and/or processes $P_1$, $P_0$, ER, $P_{avg}$, and/or OMA information until the network and/or optical transceiver is powered down.

As shown, the method may begin at 202, and at 204, the optical transceiver receives and/or sends one or more optical signals. For example, an optical transceiver may transmit an optical signal using a laser diode and/or receive an optical transmission using a PD. Different wavelengths are commonly used to send and receive optical signals. For example, an optical transceiver may transmit downstream optical signals to other devices (e.g., OLT(s) and/or ONU(s)) in the optical network at a wavelength of 1577 nm, while receiving upstream optical signals at a wavelength of 1310 nm. When the optical transceiver monitors transmitted optical signals, it is monitoring its own power, ER and/or OMA information. When the optical transceiver receives one or more optical signals, the optical transceiver monitors the power(s), ER and/or OMA of an external optical transceiver.

At 206, the optical transceiver converts the optical signals into (i) a first voltage and (ii) a second voltage. The optical signal is generally converted into at least one electrical signal (e.g., first and second electrical signals) by a photodiode. The electrical signal (e.g., the first electrical signal) may be converted into the first voltage by a detector (e.g., an RF detector), and the electrical signal (e.g., the second electrical signal) may be converted into the second voltage using a current mirror. For example, the current mirror and a resistor may convert the second electrical signal into the second voltage (e.g., in accordance with Ohm's Law).

Figure 3A:
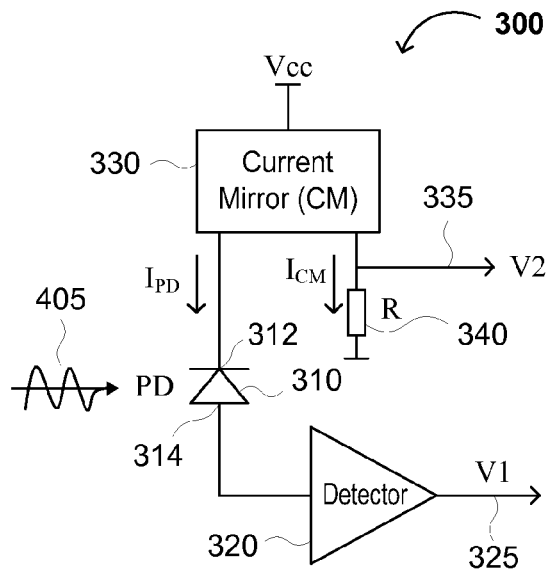
FIG. 3A is a diagram showing a first exemplary circuit according to embodiments of the present invention.

At 208, the first and/or second voltages are used to calculate (1) an ER of the optical transceiver, (2) an average power ($P_{avg}$) of the optical signal, and/or (3) an OMA of the optical signal. For example, as shown in FIG. 3A, the optical transceiver may utilize detector 320 to convert the electrical signal from the PD 310 receiving the optical signal into a first voltage V1 at node 325. The optical transceiver also uses a CM 330 to convert the electrical signal from PD 310 into a second voltage V2 at node 335. First voltage V1 correlates or corresponds to the RF power (or amplitude), and second voltage V2 correlates or corresponds to the average power ($P_{avg}$) of the optical signal. Logic and/or methodology for converting first voltage V1 and second voltage V2 to RF power and average power ($P_{avg}$), respectively, is known in the art. Average power ($P_{avg}$) is a DC quantity that can be determined from the second voltage V2. Using first voltage V1 (corresponding to the amplitude of the optical signal) and second voltage V2 (corresponding to $P_{avg}$), one may determine various parameters such as an average power ($P_{avg}$), a high power ($P_1$), a low power ($P_0$), an ER and/or an OMA of the optical signal using equations [1]-[4] discussed above.

In a further example, if a read command (e.g., to read the calculated ER, average power [$P_{avg}$], or OMA) is not received from the network (e.g., an optical network) or host, then at 210, the method 200 continues to receive and/or send one or more optical signals at 204 and determine power-related parameter information at 206 and 208 in a continuous loop. However, when the read command is received at 210, the optical transceiver may transmit a flag or state corresponding to a value range of (i) a high power ($P_1$), (ii) a low power ($P_0$), (iii) an average power ($P_{avg}$), (iv) an ER of the optical transceiver and/or (v) an OMA of the optical signal(s) at 212. For example, a state controller can provide a state value (e.g., a bit string representation of the value of a parameter, such as a $P_{avg}$, high power, low power, an ER and/or OMA). In further embodiments, at 212, one or more parametric values may be compared with one or more thresholds, representing a particular flag or state, and the corresponding flag or state is generated to indicate the status of the power-related parameter(s). The flag or state may then be transmitted to the network or host. A circuit and/or optical transceiver according to the present invention may include circuitry and/or logic for generating states and/or flags for data related to one or more parameters of the optical transceiver (see, e.g., U.S. patent application Ser. No. 13/070,358, filed Mar. 23, 2011; U.S. patent application Ser. No. 13/075,092, filed Mar. 29, 2011; and U.S. patent application Ser. No. 13/348,599, filed Jan. 11, 2012, the relevant portions of which are incorporated by reference herein). The state value may be directly transmitted to the host via a communications interface or retrieved from data memory and then transmitted to the host via the communications interface. The method then returns to 204, and operates continuously until suspended (e.g., in a power-down operation) or ended (e.g., by powering the transceiver and/or network off).

An Exemplary Circuit

In a further aspect of the invention, the circuit may include a photodiode configured to generate a first current responsive to an optical signal, a current mirror coupled to a first terminal of the photodiode, and a detector coupled to a second terminal of the photodiode. The current mirror is configured to produce a second current equal to or proportional to the first current and the detector is configured to determine a power or amplitude of the optical signal.

Figure 3B:
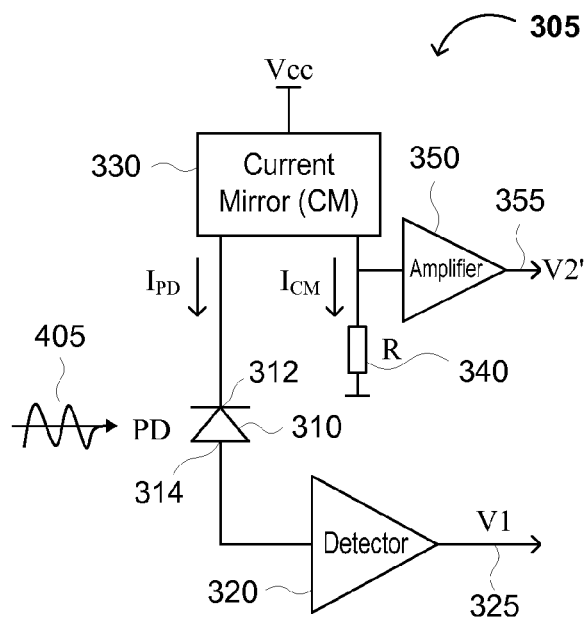
FIG. 3B is a diagram showing a second exemplary circuit according to further embodiments of the present invention.

FIGS. 3A and 3B illustrate exemplary circuits 300 and 305, respectively, in accordance with embodiments of the present invention. Circuit(s) 300 and/or 305 may form part of the circuitry and/or components of an optical receiver and/or transceiver. While FIG. 3A describes a general circuit in accordance with embodiments of the present invention, it is readily understood that any circuit configuration consistent with the present invention may be used in the exemplary optical receiver and/or transceiver. Circuit 300 comprises photodiode (PD) 310, detector 320, and current mirror (CM) 330. PD 310 can comprise a p-type/intrinsic/n-type (PIN) diode, an avalanche photodiode or any other component or device configured to receive an optical signal and convert the received optical signal into an electrical signal. Detector 320 can be a radio frequency (RF) detector or any other component and/or device sensitive to AC power and configured to generate a proportional DC output (or voltage). CM 330 comprises circuitry configured to duplicate and/or replicate a first current (e.g., $I_{PD}$) at another node 335 (e.g., $I_{CM}$).

PD 310 converts a received optical signal from one or more external components (such as one or more OLTs and/or ONUs) in a network into an electrical signal. Detector 320 receives the electrical signal from PD 310 and generates a first voltage V1 at node 325. The first voltage V1 is proportional to the RF power and represents the amplitude of the optical signal. In one embodiment, detector 320 is coupled to the cathode 314 of PD 310.

CM 330 duplicates the input current ($I_{PD}$) through PD 310. In one embodiment, CM 330 is coupled to the anode 312 of PD 310. The duplicated current ($I_{CM}$) from CM 330 may be equal to or proportional to the first current ($I_{PD}$) from PD 310. Circuit 300 may further comprise a resistance (e.g., resistor 340) sufficient to generate the first voltage V1 from output current ($I_{CM}$). In one embodiment, using resistor 340, circuit 300 generates the second voltage V2 at node 335 from the duplicated current ($I_{CM}$). For example, resistor 340 has a resistance value sufficient to convert $I_{CM}$ to second voltage V2. The second voltage V2 has a value equivalent to or convertible (e.g., proportional) to the average power ($P_{avg}$) of the optical signal.

FIG. 3B shows a second circuit 305 that further comprises an amplifier 350 to generate second voltage V2' at node 355. Circuit 305 is otherwise the same as circuit 300 in FIG. 3A. The amplified second voltage V2' may make the second voltage easier to correlate to average power ($P_{avg}$) with sufficient accuracy and/or precision (thereby increasing the accuracy and/or precision of the average power determination). In one embodiment, amplifier 350 may be a transimpedance amplifier (TIA). In further embodiments of the present invention, amplifier 350 may provide a current to voltage converting function and/or comprise a single stage amplifier, such as a source follower, emitter follower, cascode, or Darlington amplifier, configured to provide a sine wave output.

A Second Exemplary Circuit

Figure 4:
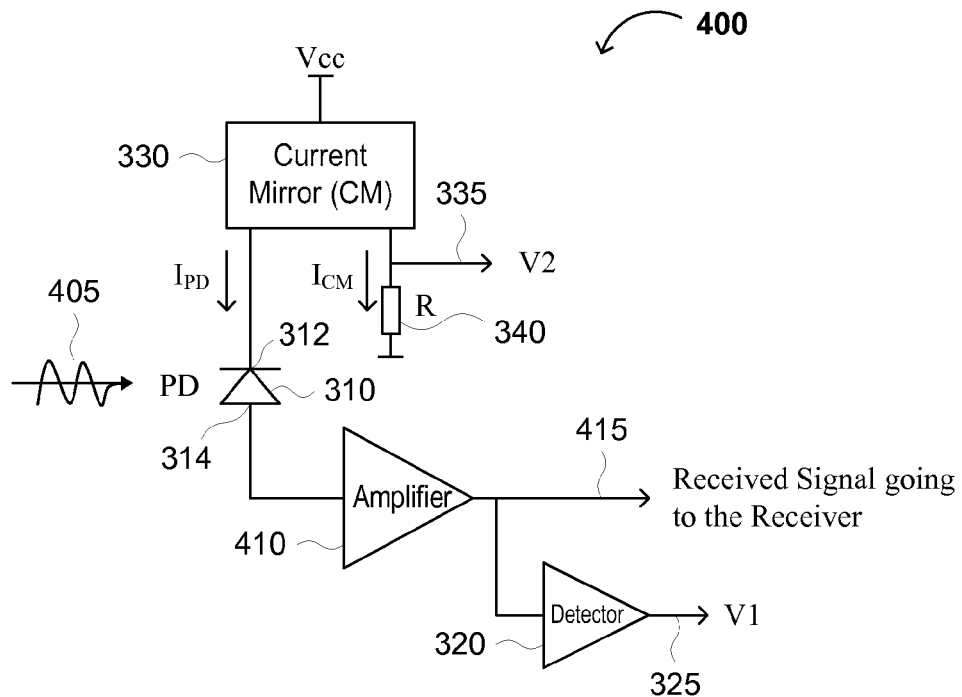
FIG. 4 is a diagram showing a third exemplary circuit according to embodiments of the present invention.

FIG. 4 illustrates a further embodiment of the present invention. The circuit 400 is substantially the same as circuit 300 in FIG. 3A, except for amplifier 410. The cathode 314 of the PD 310 is coupled to the amplifier 410, and detector 320 receives an output of the amplifier 410. It is generally understood that amplifier 410 may be any suitable amplifier, and may be a TIA, a limiting amplifier, or a combination thereof. Alternatively, amplifier 410 may provide a current to voltage converting function and/or comprise a single stage amplifier configured to provide a sine wave output, such as a source follower, emitter follower, cascode, or Darlington amplifier. Output node 415 of amplifier 410 may also provide a signal downstream to a signal processing block of the optical transceiver (e.g., a signal regeneration block, not shown) and/or a further amplifier for further processing. As in the embodiments of FIGS. 3A and 3B, the output 325 of detector 320 represents first voltage V1, which is equal and/or proportional to the high power ($P_1$). In one embodiment, detector 320 may be an RF detector.

Figure 5:
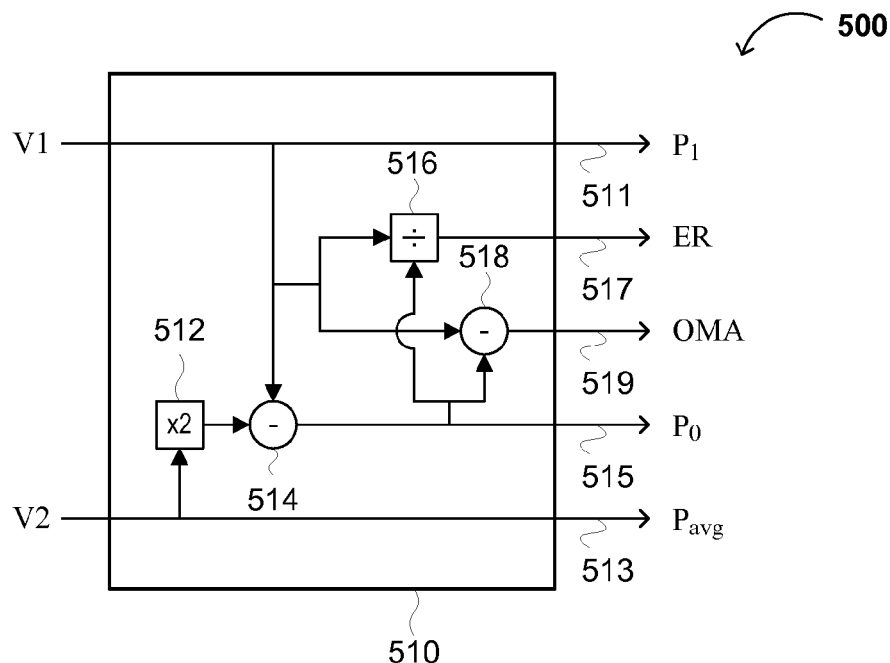
FIG. 5 is a diagram showing an exemplary power calculator according to embodiments of the present invention.

In further embodiments, the circuit(s) 300, 305, and/or 400 of FIGS. 3A, 3B and 4 may comprise logic 500 (FIG. 5) configured to determine or calculate the average power ($P_{avg}$), the high power ($P_1$), the low power ($P_0$), the ER and/or the OMA of the optical signal. As shown in FIG. 5, the logic 500 may comprise power calculator 510 for determination of parametric data corresponding to state information. Power calculator 510 is configured to receive the first voltage V1 (e.g., from node 325 in FIG. 3A) from detector 320, and the second voltage V2 (e.g., from output node 335 or 355 in FIGS. 3A and 3B) from CM 330 to generate average power ($P_{avg}$) at 513, high power ($P_1$) at 511, low power ($P_0$) at 515, ER at 517 and OMA at 519.

Figure 7:
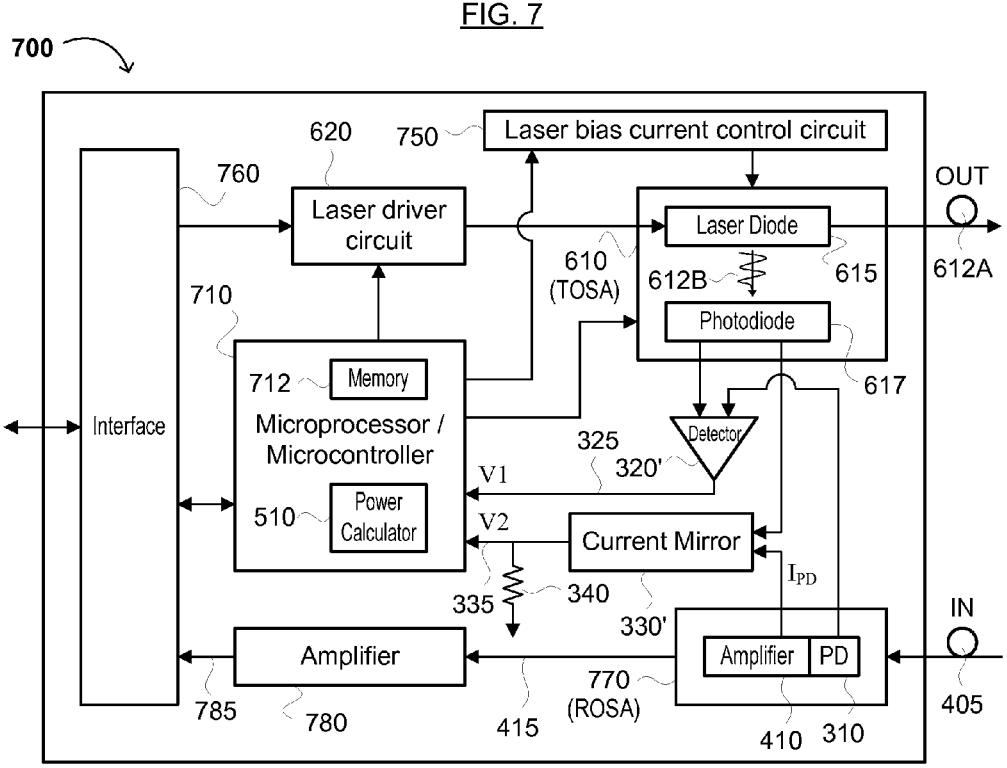
FIG. 7 is a diagram showing a second exemplary optical transceiver according to embodiments of the present invention.

Power calculator 510 is generally configured to utilize conventional mathematical operations (e.g., using standard circuit blocks configured to perform such mathematical operations) according to equations [1]-[4] above to determine various parametric values. The first voltage V1 is received at an input of power calculator 510 and may be directly output at node 511 as the high power ($P_1$). Alternatively, the first voltage V1 may be multiplied (and optionally divided) to provide an output at 511 that is proportional to the first voltage V1. The second voltage V2 is received at another input of power calculator 510, and may be directly output at node 513 as the average power ($P_{avg}$). Similarly, the second voltage V2 may be multiplied (and optionally divided) to provide an output at 513 that is proportional to the second voltage V2. A "multiply-by-2" multiplier 512 also receives the second voltage V2 and effectively doubles its value. Thereafter, a first subtractor 514 can subtract the first voltage V1 from the doubled second voltage V2 to generate a value for the low power ($P_0$) at node 515. A divider 516 can divide the high power ($P_1$) by the low power ($P_0$) to provide the extinction ratio (ER) at node 517. Finally, a second subtractor 518 can subtract the low power value ($P_0$) (as calculated above) from the first voltage V1 to determine the optical modulation amplitude (OMA) at node 519. In various embodiments, one or more of the outputs of the power calculator 510 (e.g., $P_1$ at 511, ER at 517, OMA at 519, $P_0$ at 515, and $P_{avg}$ at 513) may be stored in one or more memories (e.g., memory 712 as shown in FIG. 7) and/or transmitted to the network and/or host via an interface (e.g., interface 760 as shown in FIG. 7).

An Exemplary Optical Transmitter and/or Transceiver

An embodiment of the present invention relates to an optical transmitter or transceiver comprising one or more of the circuits discussed above, a transmitter optical sub-assembly configured to transmit the optical signal, and logic configured to process an extinction ratio from (i) the first voltage (e.g., from the detector and/or a second amplifier) and (ii) the second voltage (e.g., from the current mirror and/or a first amplifier).

Figure 6:
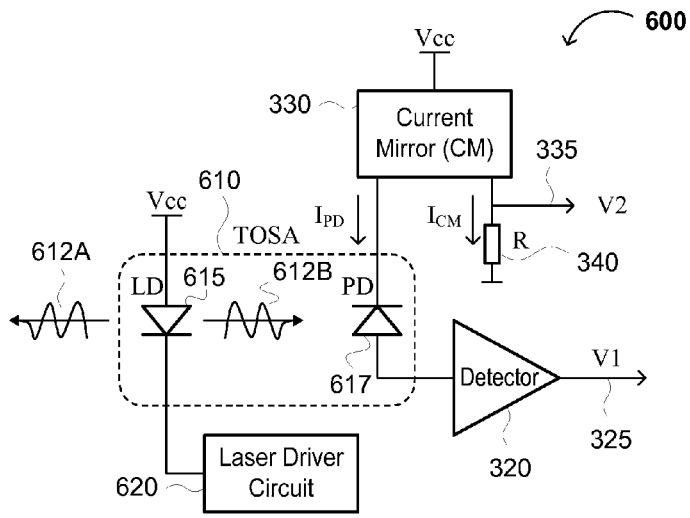
FIG. 6 is a diagram showing a simplified exemplary optical transceiver according to embodiments of the present invention.

FIG. 6 shows an embodiment of the present transmitter or transceiver, employed in conjunction with a transmitter optical sub-assembly (TOSA) 610. However, it is readily understood that any circuit configuration consistent with the present invention may be used in the exemplary optical transceiver.

In operation, a laser driver 620 sends a modulated electrical signal to a laser diode (LD) 615. LD 615 generates an optical signal having a first portion 612A and a second portion 612B. An on-board photodiode (PD) 617 within the TOSA 610 receives second optical signal portion 612B from LD 615, and converts it into an electrical signal. In some embodiments, the second optical signal portion 612B has a power that is about 1-5% of the total power of the optical signal output from LD 615. Further, the second optical portion 612B can be reflected from the LD 615 output (e.g., the first portion 612A) using a dichroic mirror, wavelength-selective filter, or other similar device. PD 617 transmits a first electrical signal to detector 320 to generate the first voltage V1 at output node 325. PD 617 further transmits a second electrical signal having a first current ($I_{PD}$) to current mirror (CM) 330. CM 330 duplicates the first current to PD 617 ($I_{PD}$) to generate and/or produce a second current ($I_{CM}$), which is equal to or proportional to the first current ($I_{PD}$). Using resistor 340 and Ohm's Law (V=IR), second voltage V2 can be generated from the output (e.g., $I_{CM}$) of CM 330. In one embodiment, detector 320 may be contained within TOSA 610, but CM 330 may be within TOSA 610 or external thereto. Otherwise, the optical transmitter or transceiver operates the same as or similar to devices comprising the detector 320 and CM 330 as shown in FIGS. 3A, 3B and 4.

FIG. 7 illustrates an exemplary optical transceiver 700 in accordance with embodiments of the present invention. Optical transceiver 700 is capable of calculating and/or monitoring its own average power ($P_{avg}$), ER and/or OMA, as well as that from other optical transmitter(s) and/or transceiver(s) in the network (e.g., an optical network) from which it receives optical communications and/or signals. As shown, optical transceiver 700 comprises interface 760, microprocessor/microcontroller (MCU) 710, amplifier 780, laser driver circuit 620, laser bias current control circuit 750, transmitter optical sub-assembly (TOSA) 610, receiver optical sub-assembly (ROSA) 770, detector 320', and current mirror (CM) 330'.

Optical transceiver 700 transmits optical data via optical signal 612A to external media (e.g., fiber optic cable) and/or components (e.g. optical splitters, optical transceivers and/or other suitable hardware) in the optical network. TOSA 610 facilitates the generation and transmission of optical signals from transceiver 700. TOSA 610 comprises laser diode (LD) 615 and PD 617. In various embodiments, PD 617 may be a PIN diode or an avalanche photodiode. The transmitter portion of optical transceiver 700 may further comprise laser driver circuit 620 and laser bias current control circuit 750. Laser driver circuit 620 sends modulated electrical signals to LD 615. Laser bias current control circuit 750, which is coupled to TOSA 610, controls a bias current to the LD 615.

When LD 615 emits an optical signal 612A, a portion 612B of the optical signal (e.g., light) is detected by PD 617. PD 617 converts optical signal portion 612B into a current that is transmitted to detector 320' for the generation of the first voltage V1. PD 617 also transmits a current to the CM 330' for the generation of the second voltage V2.

Using resistor 340 and Ohm's Law (V=IR), second voltage V2 is generated from the output of current mirror 330'. Alternatively, node 335 may be coupled to a component and/or other circuitry in the MCU 710 with high (e.g., "infinite") impedance to generate the second voltage V2. First voltage V1 and second voltage V2 may be transmitted to MCU 710 for further processing (e.g., using power calculator 510) to calculate $P_{avg}$, high power ($P_1$), low power ($P_0$), ER, OMA, etc. As discussed above, detector 320' can comprise any detector or other component or device sensitive to AC power and configured to generate a proportional DC output.

ROSA 770 converts incoming optical signals 405 into electrical signals. ROSA 770 comprises PD 310 (see, e.g., FIGS. 3A and 3B) and may further comprise an amplifier 410 (see, e.g., FIG. 4). In one embodiment, amplifier 410 may comprise a TIA or a single stage amplifier configured to provide a sine optical wave form, such as a source follower, emitter follower, cascade or Darlington amplifier, similar to the embodiment of FIG. 4. ROSA 770 transmits electrical signals to detector 320' and CM 330'. In one embodiment, detector 320' and current mirror 330' may have separate inputs for receiving separate outputs from TOSA 610 and ROSA 770. Alternatively, detector 320' and CM 330' may each comprise separate detectors and current mirrors for processing the separate signals from TOSA 610 and ROSA 770, in which case suitably configured pass gates and/or multiplexers may be used in conjunction with the separate detectors and current mirrors to enable separate processing of signals from TOSA 610 and ROSA 770.

As described above, PD 310 transmits an electrical signal to detector 320' to generate the first voltage V1. PD 310 transmits a first current (e.g., $I_{PD}$) to CM 330' to produce a second current ($I_{CM}$), which is equal to or proportional to the first current ($I_{PD}$). Second voltage V2 is generated at node 335 from the second current. MCU 710 may process power-related data from TOSA 610 and ROSA 770 separately (e.g., by time-multiplexing) or may record separate inputs from separate detectors and current mirrors configured to process separate data from TOSA 610 and ROSA 770.

As shown in FIG. 7, ROSA 770 may further transmit an electrical signal, which comprises the electrical signal equivalent of optical signal 405, via node 415 to amplifier 780, which then transmits an amplified electrical signal along node 785 to electrical interface 760. Amplifier 780 can be configured to amplify and/or limit the voltage of electrical signal 415 (e.g., to within a predetermined voltage range). In one embodiment, amplifier 780 may be a limiting amplifier, but alternatively, amplifier 780 may be a TIA, or a single-stage amplifier configured to output a sinusoidal wave form, as discussed herein.

In further embodiments, MCU 710 may comprise logic (e.g., power calculator 510) to determine various measurements, such as an average power ($P_{avg}$), a high power ($P_1$), a low power ($P_0$), an ER and/or an OMA as described with reference to FIG. 5. MCU 710 may further comprise a central processing unit (CPU) or microprocessor. In alternate embodiments, MCU 710 may comprise an application-specific integrated circuit (ASIC), a field programmable logic device (PLD), a complex programmable logic device (CPLD), or a system-on chip (SOC). MCU 710 may further comprise a memory 712 (e.g., for storing instructions, configuration data, parametric data being processed, state information, etc.).

In various embodiments, MCU 710 may communicate with TOSA 610, ROSA 770, interface 760, laser driver circuit 620, and laser bias current control circuit 750. MCU 710 may be responsible for (i) controlling the flow of data and directing where to store data in memory (e.g., memory 712), (ii) determining or calculating parametric values (such as average power, high power, low power, ER and/or OMA), (iii) setting and/or transmitting states and/or flags representing operational states of the transceiver 700 based on such parametric data, and/or (iv) controlling the overall flow for processing optical data received and transmitted by optical transceiver 700.

Optical transceiver 700 may communicate via interface 760 with a network and/or host, which can be a host processor, circuit board, stand-alone optical network device (e.g., a repeater, optical switch, set-top box, etc.) or any other component or device including a controller or processor configured to communicate and/or control at least some aspects of the transceiver 700 and/or the network. In one embodiment, the host and/or network may communicate via interface 760 to request state information and/or flags from the optical transceiver 700 and/or provide thresholds for such state information and/or flags to the optical transceiver 700. For example, the state information and flags may relate to states and/or operational ranges of the power-related parametric data, such as an average power within a normal range, a high power that exceeds a predetermined operational threshold, a low power below another predetermined operational threshold, or an ER and/or OMA within an acceptable, but potentially problematic, range (e.g., a "warning" state or flag).

Exemplary Method for Communicating Information

A further aspect of the invention relates to a method for communicating information generally comprising sending one or more optical signals from an optical transceiver, the one or more optical signals having (i) a first relatively constant frequency and (ii) an amplitude, extinction ratio, high power or average power that varies according to a second frequency less than the first frequency or by a variable amount, receiving the one or more optical signals in an optical receiver, and extracting a low speed signal having the second frequency of the variable amplitude from the optical signal.

Figure 8:
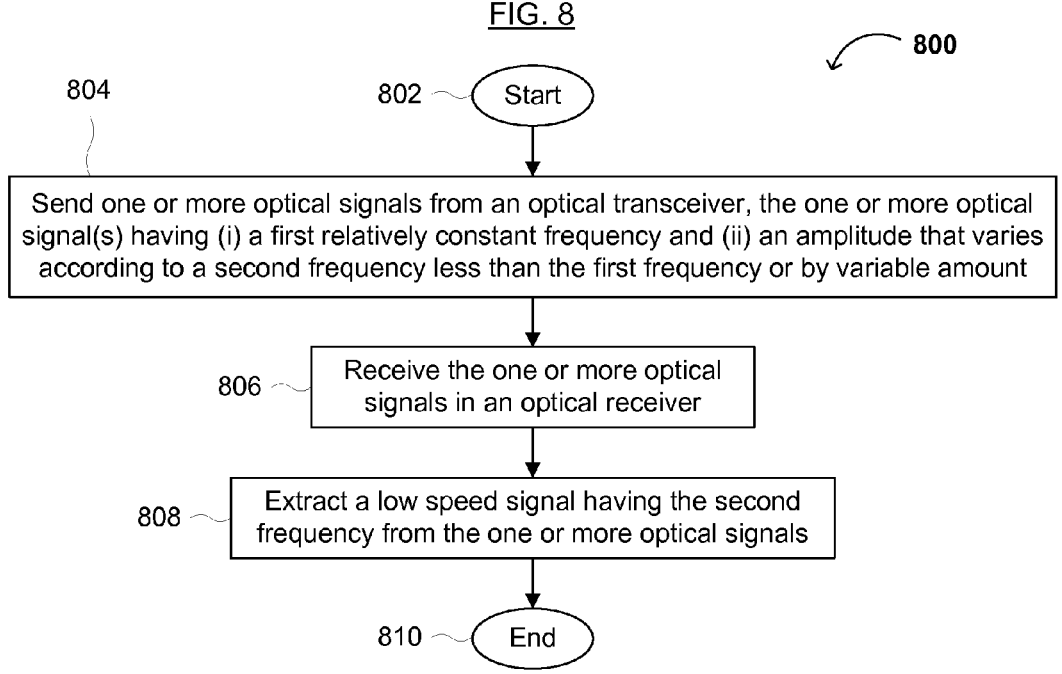
FIG. 8 is a flow diagram showing an exemplary method for communicating information in accordance with embodiments of the present invention.

As shown in FIG. 8, flow chart 800 illustrates an exemplary method for communicating information according to embodiments of the present invention. The method typically involves continuous processing through the flow, although it also encompasses a single pass through part or all of the flow. For example, in the method, upon stable application of power, an optical transceiver continuously sends and/or receives optical transmissions from the network, and continuously processes optical signals/data until the network and/or optical transceiver is powered down.

The method may begin at 802, and at 804, may involve sending one or more optical signals from an optical transceiver, the optical signal(s) having (i) a first relatively constant frequency (e.g., a high speed signal) and (ii) a power that varies by a variable amount or according to a second frequency less than the first frequency (e.g., a low speed signal). In one embodiment, the high speed signal comprises an AC signal, and the low speed signal comprises a DC signal. In further embodiments, the low speed signal is a digital or analog signal. The first, relatively constant frequency of the optical signal may be the transmission frequency of the optical input or output signal.

Figure 9:
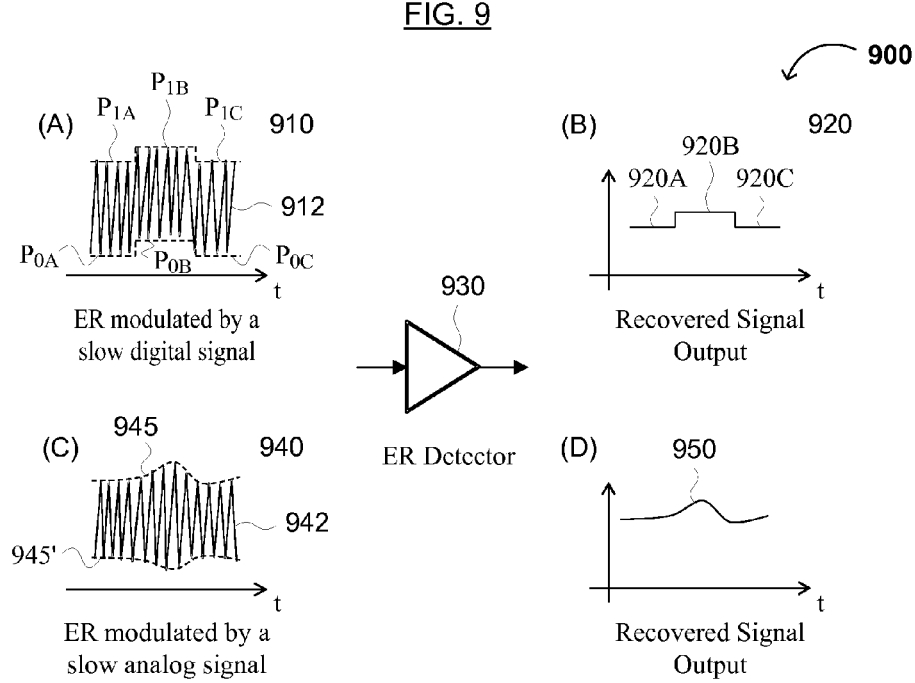
FIG. 9 is a diagram showing an information signal recovered from a modulated optical signal in accordance with embodiments of the present invention.

For example, referring back to FIG. 1, a relatively low speed logical signal 120 can be generated from an optical signal 100 (e.g., the high speed signal), which has a first relatively constant frequency. However, the present method for communicating information differs from the embodiment of FIG. 1 in that (i) the low speed signal usually has a variable amplitude (i.e., in which the amplitude can have more than n allowed states, where n is the number of allowed logic states for data transmitted over the network), or (ii) the ER may have a value other than the allowed value for binary data, but either the OMA does not change, or $P_{AVG}$ changes (and, optionally, $P_0$ and/or $P_1$ both change in the same direction). For example, as shown in FIG. 9, embodiments of the present invention provide for extraction of a low speed signal from the modulation of an optical signal. FIGS. 9(A) and 9(C) show exemplary optical input signals 912 and 942, which either (i) have a first relatively constant frequency and a power that varies according to a second frequency less than the first frequency and an amplitude, ER, $P_1$ and/or $P_{AVG}$ that has a value other than the allowed value(s) for binary data (or that varies at the second, relatively low frequency; see FIG. 9(A)) or (ii) have an amplitude, ER and/or $P_1$ that varies by a variable amount (e.g., across more than n states, where n represents the number of allowed states for transmitting data over the network and is an integer of 2 or more), generally less than the allowed value(s) for binary data (FIG. 9(C)).

Referring back to FIG. 8, at 806, an optical transceiver receives the optical signal(s) in an optical receiver, for example in ROSA 770 (FIG. 7). FIG. 9(A) shows optical signal 912 having a first relatively constant, relatively high frequency and a high power (e.g., $P_{1A}$, $P_{1B}$ and $P_{1C}$) or average power that varies according to a second frequency less than the first frequency. In the case of signal 912, the amplitude is relatively constant, but the ER may in fact vary at the second, relatively low frequency. FIG. 9(B) shows a digital signal 920 extracted from optical signal 912 by detector 930 using the changes in the extinction ratio (ER), high power and/or average power. Data bits 920A, 920B and 920C correlate with the changes in high power (e.g., $P_{1A}$, $P_{1B}$ and $P_{1C}$) of the optical signal 912. FIGS. 9(A) and 9(B) further illustrate that digital signal 920 can toggle between two or more values, but the OMA of optical signal 912 can remain relatively constant, and thus the state or data value of the optical signal 912 does not necessarily change. The changes in high power ($P_1$), average power ($P_{AVG}$), and/or low power ($P_0$) can be relatively small (e.g., ≤1 dB) because the corresponding effect on ER can be proportionally quite large when the low power ($P_0$) value is close to zero.

In an alternative embodiment, the low speed signal is generated by changing the high power ($P_1$) and low power ($P_0$) in the same direction to modulate the optical signal 912. In another embodiment, the low speed signal is generated by varying the ER of the optical signal 912, while keeping the OMA relatively constant. Referring to FIG. 9(C), components 945 and 945' of optical signal 940 may have variations in ER and/or OMA per unit time (e.g., per cycle of the high frequency signal) over or among more states than are allowed for binary and/or digital signals transmitted over the network, but in which the magnitude of the variations is less than that of the allowed states or values of the ER and OMA for those binary and/or digital signals. FIG. 9(D) shows the low-speed analog signal 950 extracted from optical signal 940 by detector 930.

Method 800 can thus further comprise determining whether the low speed signal is an analog or digital signal. A binary data signal on the network has one allowed ER value or state, and two allowed OMA states. The allowed OMA states correspond to high (1) and low (0) binary logic states. However, a digital signal may have one or more additional logic states. For example, a tertiary logic signal has three allowed logic states, a quaternary logic signal has four logic states, etc. However, if the ER of the optical data signal(s) has a value other than the allowed ER value(s) for data transmitted over the network, and varies by a frequency less than the high speed signal frequency, then the low speed signal (i.e., the ER modulated signal) is digital and is processed using standard digital signal processing circuitry. However, analog signals do not have the same characteristics as digital signals. If, for example, there are variations in ER and/or OMA per unit time that are smaller than those allowed for digital data signals over the network (e.g., over more than n states, where n is an integer equaling the number of allowed logic states in the optical data), then the low speed signal is analog and is processed using standard analog signal processing circuitry.

Referring back to FIG. 8, at 808, the optical transceiver extracts the low speed signal from the optical signal(s). Referring to FIG. 9, detector 930 represents the optical transceivers, circuits, and/or methods according to the present invention for evaluating and/or determining ER and OMA. For instance, detector 930 may comprise the circuitry and/or components according to FIG. 7 (e.g., detector 320', CM 330' and MCU 710). MCU 710 may further transmit the low speed data signal (e.g. 900 or 950 in FIG. 9) to the network or host via interface 760. The method ends at 810.

Information that can be carried over the low speed signal can include, in the case where the low speed signal is an ER-modulated digital signal, configuration data (e.g., for the transceiver and/or network), information regarding parameters of the network and/or transceiver, etc. In the case where the low speed signal is an ER-modulated analog signal, information that can be carried over the low speed signal can include real-time data for a single parameter (e.g., the laser diode temperature) of the transceiver.

Embodiments of the present invention provide for communication of data using a low speed signal, superimposed or overlaid on a relatively high speed signal. The low speed signal may be generated by modulating a high speed signal where (i) the low speed signal usually has a variable amplitude (i.e., in which the amplitude can have more than n allowed states, where n is the number of allowed logic states for data transmitted over the network), or (ii) the ER may change, but either the OMA does not change, or $P_1$ and/or $P_{AVG}$ change. According to the present invention, the transmission of low speed data is possible over the high speed signal when the low speed signal has an ER and/or OMA different from a conventional modulated digital optical signal. Information that can be carried over the low speed signal can be useful for maintaining and/or updating operations of the transceiver and/or network.

CONCLUSION/SUMMARY

Thus, the present invention provides a circuit, an optical transceiver, and/or methods for monitoring optical transceiver(s) and communicating information. Embodiments of the present invention generally relates to a circuit, optical transceiver and/or component(s) thereof, and methods of determining and/or monitoring the average power, high power, low power, ER, and/or OMA of an optical transceiver. The optical transceiver including such circuitry and/or capable of practicing such method(s) may monitor itself or a remote transceiver. Further embodiments of the present invention provide for the communication and/or transmission of information using a low speed signal superimposed on or combined with the relatively high speed optical signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit, comprising:
    (a) a photodiode configured to generate a first current responsive to an optical signal;
    (b) a current mirror coupled to a first terminal of the photodiode, configured to produce a second current equal to or proportional to the first current;
    (c) a detector coupled to a second terminal of the photodiode, configured to determine a power or amplitude of the optical signal; and
    (d) logic configured to evaluate an extinction ratio of the optical signal based on (i) a first voltage from the detector and corresponding to the power or amplitude of the optical signal, and (ii) a second voltage from the current mirror and corresponding to the second current.

2. The circuit of claim 1, wherein the detector comprises an RF detector.

3. The circuit of claim 1, further comprising a resistor coupled to a ground potential.

4. The circuit of claim 1, wherein the photodiode comprises a PIN diode or an avalanche photodiode.

5. The circuit of claim 1, further comprising a first amplifier configured to amplify the second current.

6. The circuit of claim 1, further comprising a second amplifier coupled to the second terminal of the photodiode, wherein the detector receives an output of the second amplifier.

7. The circuit of claim 6, wherein the second amplifier comprises a transimpedance amplifier.

8. The circuit of claim 1, further comprising logic configured to evaluate a modulation amplitude of the optical signal.

9. The circuit of claim 1, further comprising logic configured to evaluate a low power value for the optical signal based on the first voltage and the second voltage.

10. An optical transceiver, comprising:
(a) the circuit of claim 1; and
(b) a transmitter optical sub-assembly configured to transmit the optical signal.

11. The optical transceiver of claim 10, further comprising a receiver sub-assembly that includes the photodiode, wherein the transmitter optical sub-assembly includes a laser diode that provides the optical signal.

12. The optical transceiver of claim 10, wherein the logic comprises a microcontroller, microprocessor, an application-specific integrated circuit (ASIC), a field programmable logic device (PLD), a complex programmable logic device (CPLD), or a system-on-chip (SOC).

13. A method for monitoring one or more optical transceivers, the method comprising:
(a) receiving and/or sending one or more optical signals;
(b) generating a first current responsive to the one or more optical signals;
(c) producing a second current equal to or proportional to the first current using a current mirror;
(d) converting the first current into a first voltage using a detector and the second current into a second voltage, the first voltage corresponding to the power or amplitude of the optical signal, and the second voltage corresponding to the second current; and
(e) calculating an extinction ratio of the optical transceiver(s) and/or a modulation amplitude of the one or more optical signals based on the first and second voltages.

14. The method of claim 13, further comprising transmitting a flag and/or state corresponding to a value range of (i) the extinction ratio of the optical transceiver and/or (ii) the modulation amplitude of the optical signal.

15. The method of claim 13, wherein calculating an extinction ratio comprises using an RF power of the first voltage and an average power of the second voltage to evaluate the ratio of high power level to low power level.

16. The method of claim 13, wherein calculating an optical modulation amplitude comprises using an RF power of the first voltage and an average power of the second voltage to evaluate high power level minus low power level.

17. A method for communicating information, comprising:
(a) receiving one or more optical signals in an optical receiver, the one or more optical signals having a first frequency and
an amplitude, extinction ratio, high power and/or average power that varies according to a second frequency less than the first frequency and that may have a value other than the allowed value(s) for binary data;
(b) generating a first current responsive to the one or more optical signals;
(c) producing a second current equal to or proportional to the first current using a current mirror;
(d) converting the first current into first voltages using a detector and the second current into second voltages using a current mirror;
(e) calculating the variable amplitude, extinction ratio, high power and/or average power of the optical signal(s) based on the first and second voltages; and
(f) extracting a low speed signal having the second frequency or the variable amplitude, extinction ratio, high power and/or average power from the optical signal(s).

18. The method of claim 17, wherein the one or more optical signals comprise an alternating current (AC) signal, and the low speed signal is a direct current (DC) signal.

19. The method of claim 17, wherein the low speed signal is a digital signal, and the one or more optical signals has an extinction ratio and an average power that varies according to the second frequency.

20. The method of claim 17, further comprising transmitting the low speed signal to a host in electrical communication with the optical transceiver.

21. The method of claim 17, wherein the optical transceiver processes instructions and/or data according to the low speed signal.

* * * * *